United States Patent Office 3,439,124

Patented Apr. 15, 1969

3,439,124

PCM SWITCHING MATRIX

Jacques Georges Dupieux and Alfred Pirotte, Paris, France, assignors to International Standard Electric Corporation, New York, N.Y., a corporation of Delaware Continuation of application Ser. No. 233,473, Oct. 26, 1962. This application Mar. 3, 1966, Ser. No. 540,782

Claims priority, application France, Nov. 8, 1961, 878,270

Int. Cl. H04j 3/06

U.S. Cl. 179—15 5 Claims

ABSTRACT OF THE DISCLOSURE

The invention provides a time controlled bidirectional gating matrix for PCM switching systems. Each matrix controlling time slot is sub-divided into four basic time slots. The first basic time slot provides an opportunity for quiescence to the established after one gate opens. The second basic time slot provides an open channel for transmission of a pulse in a first direction. The third time slot provides another opportunity for quiescence to be established after a gate operation. The fourth basic time slot provides an open channel for a pulse to be transmitted in an opposite direction. This enables a transmission of pulses wtihout deterioration of pulse wave shapes.

This application is a continuation of our earlier copending application, having the same title, Ser. No. 233,473, filed Oct. 26, 1962, now abandoned and assigned to the same assignee.

This invention relates to pulse code modulation (PCM) switching systems and more particularly to means for controlling the matrix which interconnects various time division multiplex lines in such systems.

"A pulse code modulation system" includes means for converting the undulations of an analog voice signal into a number of binary coded PCM words. More particularly, suppose that—at one moment—the instantaneous sample of an analog voice signal has a particular amplitude. A pulse code modulator converts that amplitude into a corresponding pulse code word. When that PCM word is received at a distant location, a demodulator reads the code and, responsive thereto, reconstructs a voice sample pulse having the amplitude of the original sample. These reconstructed samples are then combined to form a replica of the original analog voice signal.

This invention is for use in connection with an "Electronic PCM Switching System" (Ser. No. 299,902) filed Oct. 11, 1962 by Dupieux, Le Corre, and Seneque, now U.S. Patent No. 3,281,537, and assigned to the assignee of this case. For additional details about the system in which the invention is used, reference may be made to that application. There are, of course, many other uses for a PCM switching system. Therefore, to provide a very simple and concrete example of a use of the invention in one environment, reference may be made to the concentrator art. Assume that two subscribers are talking to each other over a PCM telephone system. One lives in one town and the other lives in another town. The call is switched through a telephone center in the downtown area of a city. It is expensive to run wires from the subscribers' houses to the downtown city area. Also, space is limited in the downtown area so that it may not be possible to bring any more wires into that area regardless of cost. An answer to these and other problems is to put a concentrator in both of the towns. The talking subscribers use telephones connected to local lines which are, in turn, connected to the concentrators. When they talk, their voice signals are encoded as PCM words and then sent to the central office in "time slots" which are assigned to serve the individual local subscriber lines.

It may be assumed for present purposes that the concentrator does not cause any serious problems of the type which this invention solves. After they are encoded, the PCM words are merely sent via voice gates which open during the appropriate time slots and then close at the end of the time slot.

In the downtown office, however, there are problems which this invention is designed to solve. These problems occur because the PCM words must be taken from a time slot on one highway or line, passed through a matrix of gate switches and then placed into a time slot on another highway or line. Likewise, the same procedure must be followed with respect to PCM words sent in the opposite direction.

There are a number of considerations which will occur to those skilled in the art; however, two stand out as presenting a fairly serious problem. First, the time slots on the two channels may or may not be aligned so that it may or many not be necessary to store a PCM word received over one highway before it is sent out over the other highway. The PCM word may have many or few pulses spaced evenly or unevenly. Second, the individual pulses in the PCM words are distorted by the capacitances, inductances, and the like in the system and especially in the matrix of gates.

Thus, a wide range of operation parameters place severe design requirements upon the matrix of gates in the downtown area. One common problem resulting from a matrix designed to operate over such a wide range of parameters, is that crosstalk is likely.

Accordingly, an object of this invention is to provide new and improved PCM switching systems. In this connection, an object is to provide a new and novel matrix of gates for interconnecting a number of PCM highways. Specifically, an object is to reduce crosstalk in such a matrix.

Another object is to interconnect any channels on different highways regardless of the relative time positions of such highways.

Yet another object is to avoid distortion of the pulses in a PCM word.

In keeping with one aspect of this invention, these and other objects are accomplished by interleaving the transmission of the send and receive words as they pass through the central office matrix. In greater detail, each highway has a series of cyclically repeating time positions, each series being called a "time frame." Once during every time frame, each call has an assigned period (called a "time slot") during which a sample of the voice signal in that call is sent over the highway. Each time slot is divided into a number of time positions (called "digital time slots") which correspond to the maximum number of pulse positions in a PCM word, plus any synchronizing or other supervisory signals that may be required. Finally, each digital time slot is further subdivided into four time positions (called "basic time slots" during which the matrix gates actually open and close.

To identify the various time scales, this specification uses a notation wherein a time frame is described as having twenty-five time slots designated *t1, t2, t3 . . . t25*. There are eight digital time slots which are identified by an arabic numeral suffix. Thus, for example, the first time slot has eight sub-divisions designated *t1.1, t1.2, t1.3 . . . t1.8*. The four basic time slots are further identified by a lower case, alphabetical designation. For example, the first eight basic time slots in any time frame are designated *t*1.1*a*, *t*1.1*b*, *t*1.1*c*, *t*1.1*d*, *t*1.2*a*, *t*1.2*b*, *t*1.2*c*, *t*1.2*d*. The notation in the preceding sentence has, therefore, recorded the time periods during which the first two pulses in the first PCM word may be sent in any time frame. More will be said about this system of time identifying notation.

In accordance with this invention, the matrix of gates open and close during the basic time slots for the purposes of (a) preventing pulse distortion and (b) interleaving send and receive words. In greater detail, the PCM word from a calling subscriber is put into a buffer storage circuit when it is received over an incoming highway. During a time slot assigned to the call in question, a read out circuit causes a series of pulses to be generated in the same time coded positions as the pulses appear when the PCM word was received. During each individual digital time slot, the generated pulse is produced during the *a* and *b* basic time slots. Pulse distortion, if any, occurs as a result of reactance to the leading edge of the generated pulse; thus, it occurs during the basic time slot *a*. During the basic time slot *b*, the pulse is at full amplitude, therefore, a gate in the matrix opens and the generated pulse is passed through the matrix to a buffer store associated with the highway leading to the called subscriber. The process repeats during the *a*, *b*, basic time slots in every digital time slot.

The PCM word from the called subscriber is processed in the same manner except that each generated pulse is passed through the matrix gates during the *c*, *d* basic time slots. The basic time slot *c* is reserved to allow the leading edge pulse distortions to die away. The generated pulse is actually passed through the matrix gate during the basic time slot *d*.

Upon reflection, it is seen that each PCM word is put into buffer storage associated with the highway, as it is received over such highway. The buffer storage on each connected highway is read out during the time slot assigned to that connection. The gates open and close in a manner which interleaves the opportunity to transmit calling and called PCM words through the matrix. After each word passes through the matrix, it is buffer stored in circuits assigned to the outgoing highway. The signals are taken from this buffer and sent over the outgoing highway during the time slot assigned on that highway to the cell in question.

The above mentioned and other features of this invention and the manner of obtaining them will become more apparent, and the invention itself will be best understood by reference to the following description of an embodiment of the invention taken in conjunction with the accompanying drawings, in which.

*Symbology*

Figure 1:
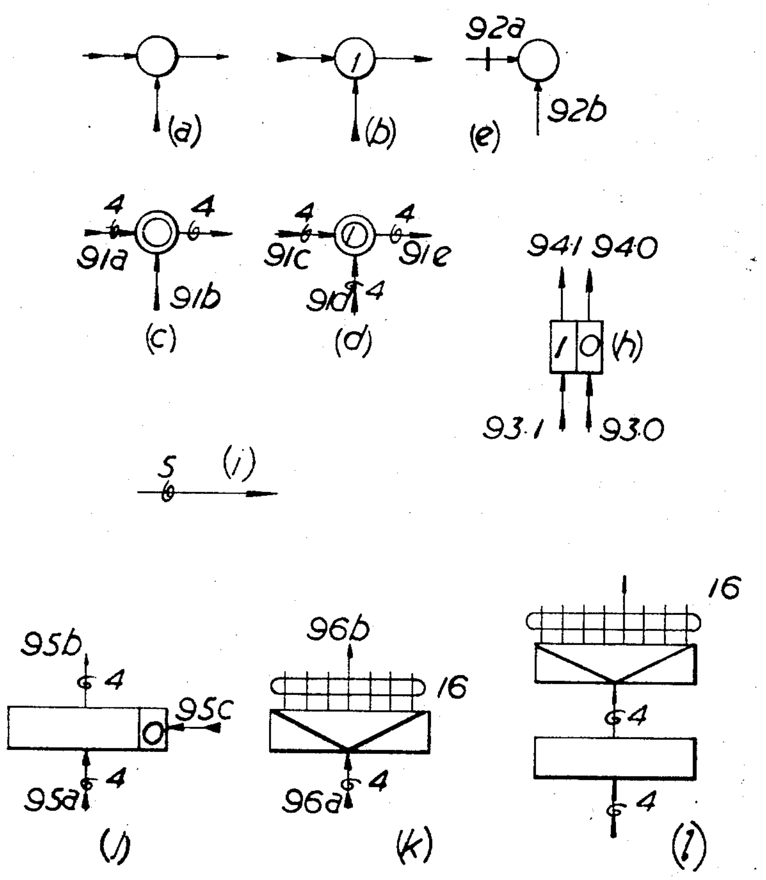
FIGURE 1 represents the different particular symbols used in the following figures.

Before undertaking a circuit description, it may be well to explain the symbology used herein.

In greater detail, we have spoken above about a specific time cycle of twenty-five channels, etc. However, the invention is not limited thereto. A more general case involves the *m* information in an analog form in a "transmitting exchange." This information must be transmitted must be transmitted simultaneously on one line toward a "receiving exchange." The analog voice signal is sampled once each frame period. The described system has a frame period duration of 100$\mu$s., for example.

The amplitude modulated pulses, obtained by means of the sampling operation are quantized and coded in one of the known binary codes and the *m* codes or "messages" are transmitted, in time succession, during a frame period.

A time interval of 4 $\mu$s. is assigned to each channel if $m=25$, for example. It will be noted that the word "channel" implies the idea of relative position with respect to an origin which is synchronized by a code transmitted on the 25th channel.

The receiving exchange comprises a clock which supplies time signals referenced *t*1 to *t*25. Each such clock pulse has a duration of 4 $\mu$s. The time interval defined by each one of these signals will be called a "normal channel time slot."

In an exemplary system, a coding with $2^7$ positions is chosen. Assuming that a binary code without redundancy is used, a given level is expressed by a 7 digit number. Each one of these digits may be the value 1 or 0. An 8th or supervisory digit is added to this number. Usually, this 8th digit has the value 1 but, since it has no meaning in the message, it is suppressed inside the switching stage. The time interval (called a "digit time slot") reserved for each one of these 8 digits is about 500 ns. (abbreviation for nanosecond$=10^{-9}$ second). The exchange clock supplies thus $10^4 \times 25 \times 8 = 2 \times 10^6$ digit time slot signals per second, so that it has a repetition frequency of 2 mc.

Each digit time slot is further subdivided into 4 equal "basic time slots," each having a duration of 125 ns. and referenced *a*, *b*, *c* and *d*. The digit time slots are identified as time slots 1 to 8. Since the digits are transmitted in the order of significance, the digit time slot 1 has the most significant digit, the digit time slot 2 has the next less significant digit, etc. The signal of the digit time slot 1 starts at the same time as a normal channel time slot signal (here designed by unprimed numbers, i.e., *t*1 to *t*25). The basic time slot *b*, for example, of the digit time slot 3 of the channel time slot *t*12 will be identified herein as *t*12.3*b*, and all other time slots will be identified in a similar manner.

On the other hand, the exchange clock also supplies "shifted channel time slots" signals (here designated by primed numbers, i.e. *t'*1 to *t'*25) which are advanced by half a channel time slot with respect to the normal channel time slot signals designated *t*1 to *t*25. The digit time solt which coincides with the beginning of these *t'*1 to *t'*25 signals is thus the digit time slot 5 and the digit time slot which coincides with the end of one of these signals is the digit time slot 4.

Briefly, in resume, the invention relates to a pulse code modulation switching system for interconnecting two circuits during "time slots" defined by the output of a basic system clock. By way of example only, twenty-five cyclically recurring time frames have been cited as defining twenty-five time channels for carrying twenty-five simultaneous conversations. The amplitude of a voice signal is sampled once for each recurrence of a channel pulse. Then, the sample is converted into a binary or "pulse code" signal. The code tells the critical characteristics of the speech sample. In this case, the binary signal may include seven digits, plus on eighth supervisory, synchronizing, or code checking digit. Thus, each channel time slot is subdivided into eight "digit time slots" so that one binary digit pulse is sent during each digit time slot. Four "basic time slots" appear in each digit time slot. The symbology adopted herein designated the channel and digit time slots. For example, it designates the time period for sending the fourth binary code, digit pulse during the twelfth channel slot as *t*12.4. All other time periods are designated in a similar manner.

The system uses not only the basic clock periods described in the preceding paragraph, but also it uses shifted time periods. These shifted periods have basic clock periods but they are shifted into another phase. The shifted time slot is identified by a primed number, (for example, *t'*12). Clearly, therefore, there will be coincidences between a time interval in the basic clock signals and an interval in the shifted signals. This is indicated by an equal (=)

mark. Thus, if the time period $t12.4$ is at least partly coincident with time period $t'13/4$, we can write $$t12.4=t'13/4$$

Therefore, one has, for instance $t12.4=t'12/4$;

$$t12.5=t'13/5$$

$t12.8=t'13/8$; $t13.1=t'13/1$; $t13.5=t'14/5$; etc. The grouping of two time division mutiplex transmission lines for forwarding the communications respectively in the two directions will be called a "trunk." Since the connections are set up by means of a switch organized in a matrix form, the trunks associated with a receiving exchange are connected to the rows and to the columns of the switch. The distribution of trunks across the switches are made in accordance with the requirements of the traffic. In the course of the description, the trunks which are connected to the rows and to the columns of the switch will be respectively called "row trunks" and "column trunks." For the needs of the transmission and for the switching, each trunk and each one of the 25 channels are identified by a binary code group or "number code." In each trunk, the homologous channels on the incoming line and on the outgoing line are identified by the same code. In the transmission process used, inside the switch, the presence of a pulse or "message signal" in a digit time slot characterizes a digit 1 and the absence of a pulse characterizes a digit 0.

It is well known that, during transmission, the time position of the message signals are affected by certain fluctuations which may introduce errors in the interpretation of the messages. One of these causes of errors lies in the fact that the time scale on the trunk is not identical to the time scale set up by the clock of the receiving exchange. To correct these errors, buffer store circuits are connected to both the incoming and the outgoing trunk lines. An incoming PCM word is stored in the buffer storage circuit associated with the incoming trunk line. There it may be delayed for a variable period which may be as long as one complete multiplex scan cycle, called a time frame. The stored PCM word is taken out of storage and sent to the outgoing trunk line buffer store where it is held until the appearance of the time channel on the outgoing trunk. This way, the two trunk lines may operate on independent time bases.

In the switching stage, one may first, set up and cut off connections between one channel in a row trunk and one channel in a column trunk, and second, transmit at the selected channel time slots the messages related to the different connections. In each trunk, the input of the outgoing line data store and the output of the incoming line data store are connected to a common data transfer conductor. This conductor is, itself, connected to a row trunk or to a column trunk. Thus, the path which must be followed by the communication related to a given connection is established by the selection in the switch, during the duration of the channel time slot for setting up the considered connection, of a crosspoint between a row and a column. This selection is made by an interpretation of an instruction read in a "space path store" associated with a row trunk.

The addresses of the messages stored in the incoming and outgoing line data stores of both trunks, concerning the connection, are obtained by interpreting, during the same time interval, instructions read in two "time path stores" associated respectively with the row trunk and with the column trunk. One can then select, in each one of the considered data stores, one of the $m-1$ elementary data stores which contains a message written in an elementary data store of incoming line of one of the trunks. The selected message is transmitted, in series form, to the elementary data store of outgoing line of the other trunk.

One has thus to transmit during the setting up channel time slot two messages through the switch: one from the row trunk towards the column trunk, the other in the opposite direction. Since the time interval assigned to a message signal is 500 ns., 250 ns. have been reserved for the transmission, through the switch, of the signals related to each one of the two directions of transmission. Since a message comprises 7 digits, and since the duration of one channel time slot is 8 digit time slots, it appears that the transmission might be carried out, for instance, between the digit time slots 2 to 8 and that the digit time slot 1 might be reserved to the reading of the instruction in the path store and to its storage in a register.

Since the duration of one message signal is at most 250 ns., it is realized that the effect of the parasitic elements (capacitances, response time of the diodes and of the transistors, etc.) should be important on so short signals and that their rising time may reach an appreciable fraction of the duration. This is a source of trouble which is eliminated by the $a$ and $c$ basic time slot delays in pulse transmission. It will be noted that, in a telephone or telegraph exchange, which uses such a switching stage, the trunk circuit may be placed at a certain distance from the switch—this distance being obviously variable according to the trunks—and that the connection between the circuit and the switch input presents a parasitic capacitance which is not negligible. The parasitic capacitances in the data stores and in the switch also contribute to the distortion of the signal, if no correction is provided.

Continuing with an explanation of the symbology used herein,

FIGURE 1 represents the different particular symbols used wherein:

FIGURE 1(*a*) represents a single AND circuit;

FIGURE 1(*b*) represents a single OR circuit;

FIGURE 1(*c*) represents a multiple AND circuit, i.e. comprising, in the case of the example, four AND circuits one of the inputs of which is connected to each one of the conductors 91*a* and the second input of which is connected to a common conductor 91*b*;

FIGURE 1(*d*) represents a multiple OR circuit which comprises, in the case of the example, four two input OR circuits 91*c* and 91*d* which enable to obtain, on the four output conductors 91*e*, the same signals as those applied on either one or the other of the inputs;

FIGURE 1(*e*) represents a two input AND circuit 92*a*, 92*b*, which is blocked when a signal is applied on the input 92*a*;

An input of an AND circuit is described as energized when a signal is applied on the input and an AND circuit is described as activated if all its inputs are energized simultaneously;

FIGURE 1(*h*) represents a bistable circuit or flip-flop receiving a control signal on one of its inputs 93.1 or 93.0 to set it or to reset it, respectively. A voltage of the same polarity, as the control signals, appears on the output 94.1 when the flip-flop is in the 1 state and on the output 94.0 when it is in the 0 state. If the flip-flop is referenced B1, the logical condition characterizing the fact that it is in the 1 state will be written B1, the one characterizing the fact that it is in the 0 state will be written $\overline{B1}$;

FIGURE 1(*i*) represents a group of several conductors, five in the considered example;

FIGURE 1(*j*) represents a flip-flop register. In the case of the figure, it comprises four flip-flops whose 1 inputs are connected by the conductors of the group 95*a* and whose 1 outputs are connected to the group of conductors 95*b*. The digit 0, placed at one of the ends of the register, means that the register is cleared when a signal is applied on the conductor 95*c*;

FIGURE 1(*k*) represents a decoder which, in the case of the example, transforms a 4 digit binary code group received on the group of conductors 96*a* into a 1 out of 16 code, i.e. a signal appears only on one out of the 16 conductors 96*b* for each one of the numbers stored at the input;

FIGURE 1(*l*) represents the combination of a register and a decoder. In the course of the description, the expression "group of conductors" will be frequently used. This expression characterizes:

either a certain number of conductors, each one of these being assigned to the transmission of a particular signal, the different signals presenting a certain common characteristic;

or a certain number of conductors assigned to the transmission of a binary code.

Thus, a group of conductors assigned to the transmission of the channel codes or of the channel time slot codes will comprise $v$ conductors.

*Brief description*

Figure 2:
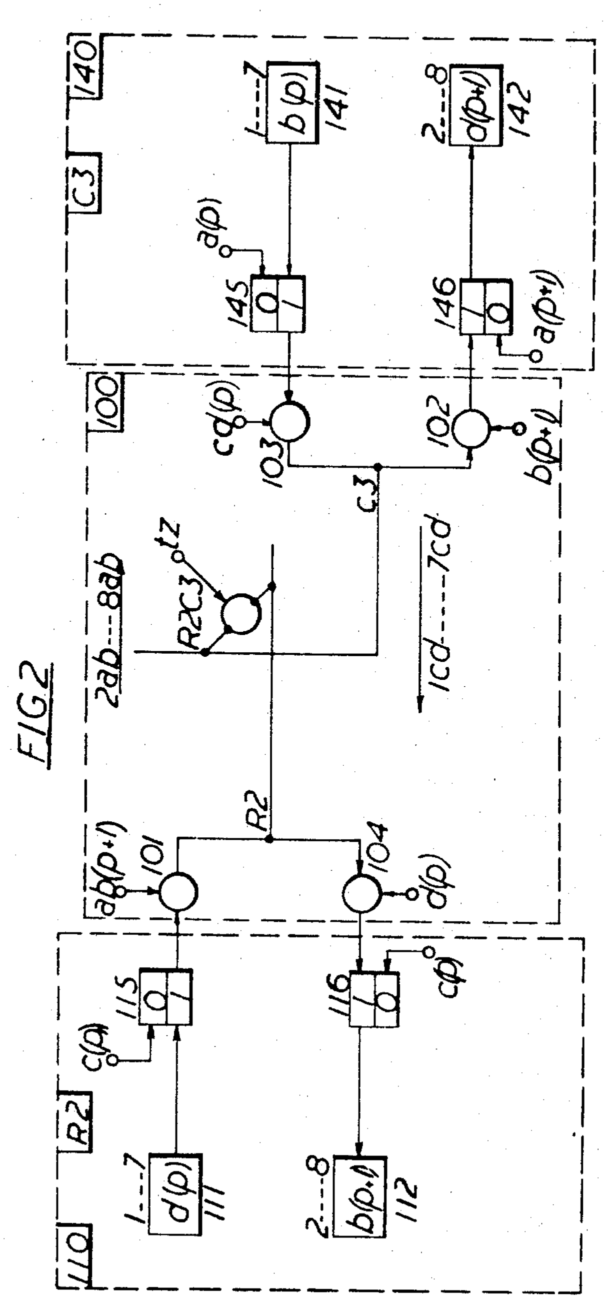
FIGURE 2 represents in a diagrammatic form the circuits involved during the bidirectional transfer of data through the switch.

The invention uses a time control technique in an electronic switching telephone system comprised of a plurality of time division multiplex trunks or highways. In FIG. 2, two of the trunks or highways are designated 110, 140. Each trunk or highway has synchronized recurring time slots for forming communication channels. Incoming buffer memory means 111, 141 and outgoing buffer memory means 112, 142 are associated with each of the highways.

Time controlled, path storage memory means 124, 134 (FIG. 3) are provided for selectively operating the incoming and outgoing memory means. That is, gate 101 opens during basic time slots *ab*. After leading edge distortions die away, gate 102 opens during basic time slot *b* so that communication is extended in one direction during a first half of each basic time slot. Gate 103 opens during basic time slots *cd*. Again, after leading edge distortions die away, gate 104 opens during basic time slot *d* so that communication is extended in an opposite direction during a second half of each time slot. The matrix gate R2C3 in matrix 100 opens during the entire time slot of the channel assigned to serve a particular call for selectively coupling the incoming memory on one of the highways to the outgoing memory on the other of the highways during each recurring channel time slot committed to serve the particular call.

*Detailed description*

FIGURE 2 represents, in a diagrammatic way, the circuits involved in the bidirectional transfer of data through the switch 100, between a channel in the row trunk referenced 110 (which is connected to the row R2 of the switch) and a channel in the column trunk 140 (which is connected to the column C3 of the switch), this operation being performed during an assigned channel time slot (here generically called *tZ*) of setting up of this connection. The row R2 and the columns C3 which are connected, in *tZ*, by the opening of the bidirectional electronic gate R2C3, have been shown in the switch 100. Each row and each column of the switch is connected to the output of an incoming line gate (101 for the trunk 110, 103 for the trunk 140) and the input of an outgoing line gate (104 for the trunk 110, 102 for the trunk 140).

As it has been seen previously, the addresses of the elementary PCM words for this connection are extracted from the time path stores of the trunks 110 and 140 and are available during the time *tZ*. The elementary data stores located at these addresses are represented by rectangles 111 (for the data store of incoming line), 112 (for the data store of outgoing line) in the circuit 110; and 141 (for the data store of incoming line), 142 (for the data store of outgoing line) in the circuit 140. These rectangles show symbolically the $p-1$ cases of the corresponding elementary data store. When an incoming line elementary data store is involved, the $p-1$ cases read successively at time intervals of the one digit time slot and the information thus obtained are written at the same rhythm in an incoming line flip-flop (115 for circuit 110, 145 for the circuit 140). These flip-flops are reset at still the same rhythm but at times chosen such as the information stored has been utilized previously by the opening of the incoming line gates associated with them, (the gate 101 is associated with the flip-flop 115 and the gate 103 is associated to the flip-flop 145). This information, transmitted through the crosspoint R2C3, is written in an outgoing line flip-flop (146 for the circuit 140, 116 for the circuit 110) by the opening of the gate of the associated outgoing line (the gate 102 is associated with the flip-flop 146, the gate 104 is associated with the flip-flop 116). These flip-flops are reset at time intervals of one digit time slot and at times chosen so that the stored information has been previously transferred in the corresponding case of the outgoing line elementary data store.

The time distribution of these transfer operations will be studied now in detail.

The gate R2C3 is activated during the channel time slot *tZ*, which is assigned to this call. This time slot has $p-1$ digit time slots reserved for the bidirectional transfer of the $p-1$ digits of a PCM word. A time interval of one digit time slot is thus reserved for the transmission of each digit. During each digit time slot, the basic time slots *a* and *b* are reserved for the transfer from the row trunk toward the column trunk. The basic time slots *c* and *d* are reserved for the transfer in the opposite direction from the column toward the row. These time intervals are very short (250 ns.). The parasitic elements of the circuits act in an important way on the shape of the signals which reach their maximum amplitude only after an important fraction of the time intervals *ab* or *cd*. The parasitic elements involved may be enumerated as follows:

(1) Response time of the semiconductor elements;

(2) Parasitic capacitance in the data stores;

(3) Parasitic capacitance of the conductors connecting the trunk circuits to the switch. Since the trunk circuits may be located at variable distances from the switch, these capacitances are different from one trunk to the other;

(4) Parasitic capacitance in the switch between the path established by the opening of the gate R2C3 and the ground.

To obviate for these inconveniences, flip-flops have been located in the trunk circuits and coincidence gates in the switch. The path set for the data transfer, related to a connection between a row trunk and a column trunk, has thus been divided into three sections:

from the incoming line data store to the incoming line flip-flop;

from the incoming line flip-flop to the outgoing line flip-flop;

from the outgoing line flip-flop to the outgoing line data store.

It will be assumed that the parasitic elements in each one of these sections have a value such as the rising time of a message signal pulse is at most equal to the duration of a basic time slot.

The time organization of the data transfer is then set up according to the following rules:

The information written in a store circuit or in a flip-flop is available for reading during two successive basic time slots and the reading is effective only during the second one of these basic time slots;

An information which has to be written in a store circuit is available during two basic time slots and the writing is effective only at the second of these basic time slots. This rule results obviously from the first one;

The resetting of a flip-flop is carried out during the basic time slot which precedes immediately the basic time slot reserved to the effective performance of the writing in order to avoid the possibility of writing a wrong signal;

A flip-flop receiving, for instance, a signal at the basic time slot *a* on its 1 input and which is in the 0 state, is effectively in the 1 state at latest at the beginning of the basic time slot *b*, i.e. with a time lag of at most one basic time slot.

Thus, two basic time slots are assigned to each operation (i.e. two for transmission in a calling to called direction and two for transmission in a called to calling direction). During these two basic time slot intervals, the signal increases to its final amplitude during the first basic time slot and is available for transmission during the second basic time slot. This organization allows a reshaping of the signals in each one of the sections.

According to these rules, each case of an elementary data store is prepared for the reading and writing during two successive basic time slots, but only the second one of these basic time slots corresponding to the effective reading has been indicated in the rectangle 111, 112, etc. in order to simplify the representation.

The transfer of a message signal from a row trunk towards a column trunk is carried out in the following way. The message signal read in the data store 111 is written in the flip-flop 115. The state of this flip-flop is read by the activation of the incoming gate 101 and the corresponding signal is transferred to the outgoing line flip-flop 146 by the activation of the outgoing line gate 102. The state of this flip-flop is transferred to the corresponding compartment of the data store 142. Since the basic time slots *a* and *b* are reserved, in the switch, for this transfer, the gate 101 which reads the state of the incoming flip-flops 115 is thus activated during the basic time slots *a* and *b*, according to the rules just stated.

During the preceding basic time slot *a*, this flip-flop was reset by the activation of the outgoing line gate 102. The information is thus available in the flip-flop 146 during the basic time slots *c* and *d*. The circuits provided in the outgoing line data store 142 allow transmission over trunk LS to be carried out during the basic time slot *d*. Since the basic time slots *c* and *d* are reserved for the writing in the incoming line flip-flop 115, this latter is reset at the time *c* and circuits are provided in the incoming line data store 111 in order that the reading should be effective at the basic time slot *d*.

The transfer of the PCM word from a column trunk toward a row trunk is carried out in a similar way. The gates 103 and 104 are activated respectively during the basic time slots *cd* and *d*. The flip-flops 145 and 116 are respectively reset during the basic time slots *a* and *c*. The incoming line data store 141 is read during the basic time slot *b* and the writing in the outgoing line data store 112 is effective during the basic time slot *b*.

The incoming line and outgoing line flip-flops are reset during the basic time slot *c* in a row trunk, and during the basic time slot *a* in a column trunk;

A PCM word read during a given basic time slot in an incoming line data store is written during the same basic time slot in the outgoing line data store.

It is thus seen that the addition of incoing line and outgoing line flip-flops in the established path results in a time lag of one digit time slot.

It will be seen that, in an incoming line data store, the case in which is written the first signal—or signal of rank 1—of a message, is read at the digit time slot 1, or digit time slot of order 1, the one in which is written the signal of rank 2 is read at the digit time slot of order 2, the one in which is written the signal of rank P is read at the digit time slot of order P.

One can see that a signal of rank P written in the incoming line data store of the row trunk 110, being read at the basic time slot *d* of the digit time slot of order P, it is transmitted through the gate 101 at the basic time slots *a* and *b* of the digit time slot of order $P+1$, and that it is written in the case of rank P of the outgoing line data store of the column trunk 140 at the basic time slot of the digit time slot of order $P+1$. The transfer of a message in the direction from the row trunk toward the column trunk is thus carried out through the switch between the times 2*ab* and 8*ab*. It may also be seen that the transfer of a message in the opposite direction is carried out through the switch between the times 1*cd* to 7*cd*, It is thus seen that the time interval ranging between the times 1*c* and 8*b* is used for the transfer of the signals through the switch and that no transfer at all takes place in the time interval 8*c*–1*b*.

Since the crosspoint R2C3 is selected by the interpretation of the corresponding instruction extracted from the space path store of the trunk 110, the said instruction must be available during the time interval 1*c*–8*b*. On the contrary, owing to the delays brought by the incoming line and the outgoing line flip-flops, the addresses of elementary data stores must not be available during the same time interval. If one examines, the row trunk circuit, it is seen that the incoming line elementary data store is read in the time interval 1*d*–7*d*. Since this store is activated during the two successive basic time slots *c* and *d*, the time interval during which the instruction must be available is 1*c*–7*d*. In the same circuit, it is seen that the instruction must be available for the reading of the outgoing line elementary data store during the time interval 2*a*–8*b*. It may be seen, in a similar way, that the instruction in the column trunk circuit must be available, during the time intervals 1*a*–7*b* for the selection of the incoming line elementary data store, and 2*c*–8*d* for the selection of the outgoing line basic data store.

It is thus seen that, in a row trunk, a time interval 8*c*–1*b* exists during which it is not necessary that the instructions should be available for any one of the two stores. The clearing of an instruction register and the writing of a new instruction in the register may be performed during a time interval of four basic time slots. The instructions for the reading in the incoming line data and for the writing in the outgoing line data may be supplied by one single instruction register.

On the contrary, in a column trunk, this clearing time interval is 7*c*–8*d* for the incoming line store and 1*a*–2*b* for the outgoing line store. It is seen that these times do not overlap and that provision must be made for storing the instruction during the whole duration of the channel time slot. This is obtained by associating two registers assigned, the first one to the writing of the addresses in the incoming line data store (instruction available from 1*a* to 7*b*) and the second one to the writing of the addresses in the outgoing line data store (instruction available from 2C to 8*d*). The instruction will be transferred from the first to the second register during the time interval 1*a*–2C during which the instruction is already used for the incoming line store and is not yet necessary for the outgoing line store.

It will be observed that the rest time interval for each data store lasts six basic time slots. This enables, in a particular mode of realization, to unify the operation times in the row trunk and column *n* trunk circuits. Thus the time intervals during which the instructions must be available will be:

1*a*–7*d*, for the incoming line data store;
2*a*–8*d*, for the outgoing line data store.

The rest time is thus reduced to four basic time slots. In this case, two instruction registers are associated with each time path store, in a row trunk and in a column trunk.

Figure 3:
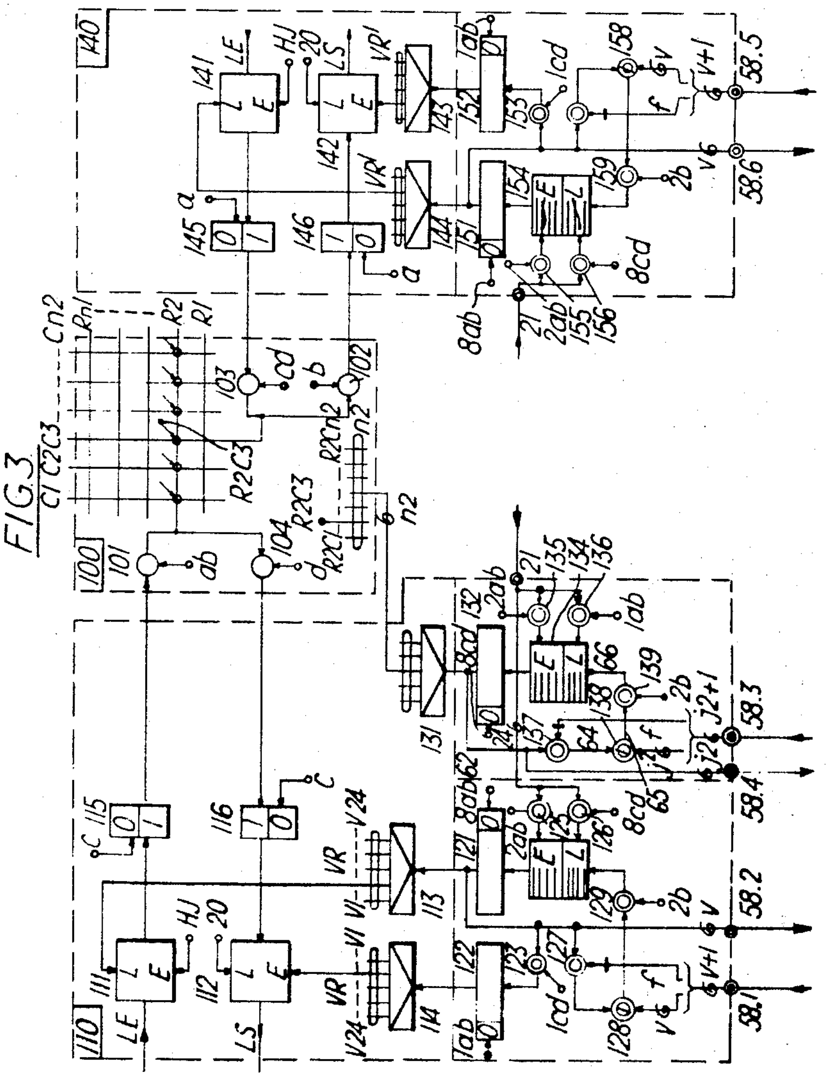
FIGURE 3 represents the detailed diagram of the circuits involved in a switching stage, during the flowing away of a given communication.

FIGURE 3 represents the detailed diagram of the circuits involved in a switching stage during the flowing away of a communication between the trunks R2 and C3.

The switch 100 and the trunk circuits 110 and 140 have the same references as on FIGURE 2.

Some of the elements located in the upper part of the circuits 110 and 140 delimited by a dotted line have the same references as the corresponding elements of FIGURE 2. In particular the data stores, represented by thick line squares, are referenced 111, 112, 141, 142. The decoders 113, 114, 143, 144 having the outputs V1 to V24 and the decoder 131 associated to the row trunk 110 having the outputs R2C1 to R2 C*n*2 have also been shown on this part.

The lower part of the row trunk circuit 110 is divided into two parts by a dashed vertical line. The time path store 124 and its associated circuits have been shown on the left hand side, and the space path store 134 and its associated circuits have been shown on the right hand side. The lower part of the column trunk circuit 140 comprises the time path store 154 and its associated circuits.

Before studying the operation of these circuits, the organization of the data and path stores which all comprise $m-1$, or 24 lines will be briefly described. Each one of the lines V1 to V24 of an incoming line data store is assigned to the writing of the message transmitted on one of the channels 1 to 24. This writing is carried out at the trunk time, shown symbolically on FIGURE 3 by the arrow with the reference HJ and ending on one of the sides of the square referenced E for "write" operation. In the outgoing line data store, the reading is made at the exchange time by the normal channel time slot signals 20 shown symbolically on the figure by the arrow with referenced 20 and ending on one side of the square having the reference L for "reading."

If one considers, for instance, the trunk circuit 140, the reading of a message written on one of the lines VR of the incoming line data store of a trunk, and the writing of a message on the corresponding line VR of the outgoing line data store are carried out by the interpretation, in decoders 113 and 114, of the channel code VR extracted from the time path store 124 associated with this trunk. The reading of the instructions written in the path stores is carried out in a cyclic way at the exchange time materialized by the shifted channel time slot signals 21. These signals being shifted in advance with respect to the signals 20 which control the data transfer, the instructions are extracted a certain time before they are necessary. The reading of a path store, the space path store 134 for instance, is carried out in the following way. The shifted channel time slot signals referenced *t'*1 to *t'*24 are available on the group of 24 conductors 21 and each one of these conductors is connected to the corresponding line of the store, through an AND circuit. The 24 AND circuits which control the reading of the space path store 134 have been represented by the multiple AND circuit 136 and each one of these latter is activated, in the case of the example at the time 1*ab*. The instruction thus read is written in the register 132. It is assumed that the operation is completed at the end of the time interval, i.e. at the end of the time *b* in the example considered.

By way of non-limitative example, it is assumed that the store matrix used is of the type in which a number code is destroyed when read and replaced by a "zero code." A capacitive or a ferrite core store or a store of the "circulation line" type may be used.

Provision must thus be made for a rewriting device of the codes read in the matrix 134 during the time interval during which the instruction is used for the selection of an address (the crosspoint R2C3 in the case of the example). For that, the group of output conductors 62 is connected to the group of conductors 66 assigned to the writing of the codes in the matrix through the AND circuit 137 and the OR circuit 138. When the code written in the register 132 and coming for instance from the line 13 must be rewritten without modification in the matrix, the AND circuit 137 is activated. The line 13 being activated in time slot 2*ab* by the activation of the AND circuit 135. The code is transmitted in parallel form to the matrix columns over the groups of conductors 62, 64, 65 and 66 by the activation, in time slot 2*b*, of the multiple AND circuit 139. A code read in the line 13 at the time *t'*13/8*d*–*t*12.8*d* is thus rewritten in the same line at the time *t'*13/2*b*–*t*13.2*b*.

The modifications brought to the contents of a line may be the replacement:

of a number code by the zero code;
of a number code by another number code;
of a zero code by a number code.

The AND circuit 137 is assigned to the control of this code modification operation. A "code modification" signal appearing on the blocking input 58.3*f* of this AND circuit during the course of the considered normal channel time slot (in the case of the example, this channel time slot is *t*13) characterizes this operation and the code which is present on the group of conductors 62 cannot be rewritten. If, during this time, no signal at all appears on the inputs 58–3 of the multiple OR circuit 138, no number code at all is written in the corresponding row of the matrix which thus stores the zero code. If a number code is applied during this time on the group of conductors 58–3, it passes through the OR circuit 138 and is written in the matrix 134. The conductor 58.3*f* on which is transmitted the code modification signal is an additional conductor associated with the group of conductors 58.3 on which is transmitted the new code to be written.

The codes are transmitted to the path stores through one multiple AND circuit placed outside the switching stages which is activated at the normal channel time slot of connection setting up. The signal which activates this AND circuit is used for the elaboration of the signal 58.3*f*.

The object of the invention is to provide an improvement to replace earlier circuits without any other modification.

The organization of a space path store has just been described.

The organization of the row trunk or of the column trunk time path stores is identical except for the timing which will be studied further on in detail. The references of the homologous elements in the three stores represented on the figure, have identical units figures. The tens figure "3" characterizes the space selection elements, the tens figures "2" and "5" characterize the time selection elements respectively in the row trunk and in the column trunk.

The time organization of the path stores in the particular case when the times are unified in the row trunk circuits and in the column trunk circuits and for which the circuits used are shown on FIGURE 3, will be described now in detail.

As it has been seen previously, the instructions must be available in the corresponding registers during the following time intervals:

1*c*–8*b*, for the selection of the crosspoint;
1*a*–7*b*, for an address in an incoming line data store;
2*a*–8*d*, for an address in an outgoing line data store.

It is seen that, in each case, four successive basic time slots are available for carrying out the reading in the store and the writing of the instruction in the corresponding register, which must have been previously reset to zero after the end of the data transfer carried out at the preceding normal channel time slot. This time interval is divided into two equal parts. The first part is reserved for the clearing of the register and the second part for the reading of the store and the writing in the register. Thus, as it has been seen previously, in a space path store, the register 132 is cleared at the time 8*cd*, the matrix 134 is read in 1*ab* (AND circuit 136) and the rewriting takes place in 2*b*.

In the row trunk circuit 110, the selection of the addresses is controlled in the incoming line data store, by the selector comprising the register 121 and the decoder 113, and in the outgoing line data store, by the selector comprising the register 122 and the decoder 114. The register 121 being cleared in 8*ab*, the matrix 124 is read in 8*cd* (AND circuit 126) and the rewriting takes place in 2*b*. The instruction is thus well available in the register 121 during the time interval 1*a*–7*d*. The register 122 being cleared in 1*ab*, the instruction written in the register 121 is copied therein at the time 1*cd* delimited by the multiple AND circuit 123. The instruction is thus well available in this register during the time interval 2*a*–8*d*. The time organization of the time path store located in the trunk circuit 140 is identical to that described.

While the principles of the above invention have been described in connection with specific embodiments and particular modification thereof, it is to be clearly understood that this description is made by way of example and not as a limitation of the scope of the invention.

We claim:

1. A time division multiplex system comprising a plurality of multiplex highways interconnected by a space division matrix of time controlled gates,
   - incoming and outgoing buffer data storage means for storing samples of message signals,
   - said buffer storage means being individually associated with each of said highways and interposed between the ends of the highways and said matrix,
   - a system time based generator means for generating clock pulse signals defining cyclically recurring time frames during which said system operates,
   - each of said time frames being defined by a plurality of said clock pulse signals forming a plurality of cyclically recurring time slots for defining individual message channels,
   - each of said message channels being further defined by a plurality of said clock pulse signals forming a predetermined number of digital time positions,
   - each of said digital time positions being divided by said clock pulse signals into a number of basic time slots,
   - means for encoding message signals into a plurality of digital signals to form a PCM word,
   - means effective during each message channel time slot for transmitting at least one digital signal of said PCM word per digital time position,
   - means effective during each digital time position for transmitting said digital signals through said matrix in one direction during at least one of said basic time slots and in an opposite direction during another of said basic time slots,
   - other of said basic time slots forming buffer time periods for enabling quiescence to be established between each signal transmission period,
   - said last named means comprising a plurality of gates operated responsive to said clock pulse signals for providing send and receive functions which transmit send and receive PCM words so that the digital pulse positions of said send and receive words are interleaved within the time channel signal with buffer time periods between said positions, and
   - means for delaying said digital signals by one of said digital time positions during the transmission from one to another of said buffer store means.

2. A time division multiplex system comprising:
   - means for generating time slot signals,
   - a plurality of highways interconnected via a matrix of crosspoint gates,
   - means for transmitting and receiving message signals sent and received over said highways during time slots in the form of binary coded PCM words,
   - first buffer storage means individually associated with each of said highways, and interposed between an end of the associated highway and a corresponding inlet to said matrix for buffer storing said PCM words as they are received over said highway,
   - other buffer storage means also associated with each of said highways and interposed between an end of the associated highway and a corresponding outlet from said matrix for buffer storing said PCM words after they are transmitted through said matrix and before they are sent out over said associated highway, and
   - matrix gate operating means for interleaving the send and receive pulse positions with buffer time periods assigned to the transmissions of PCM words from one of the buffer storage means through said matrix crosspoint gate to another of said buffer storage means,
   - means for providing four time successive signals (*a, b, c, d,* respectively) which divide each of said digital time slots into four successive basic time slots,
   - said interleaving means comprising first gating means operated responsive to said *a* and *b* time signals and connected between the first buffer storage means of a calling highway and the corresponding matrix inlet second gating means operated responsive to said *b* time signals and connected between the other buffer storage means of a called highway and the corresponding matrix outlet,
   - third gate means operated responsive to said *c* and *d* time signals and connected between the first buffer store of said called highway and the corresponding matrix inlet, and
   - fourth gating means operated responsive to said *d* time signal and connected between the other buffer store of said calling highway and the corresponding matrix outlet.

3. The system of claim 2 and means responsive to each operation of said first gate for reading out one PCM pulse from said first buffer store of the calling highway, means responsive to each operation of said second gate for transmitting a read out pulse through said matrix to said other buffer store means of said called highway, means responsive to each operation of said third gate for reading out one PCM pulse from said first buffer store of the called highway, and means responsive to each operation of said fourth gate for transmitting a read out pulse through said matrix to said other buffer store means of said calling highway.

4. The system of claim 3 and means wherein said *a* and *c* basic time slots have a duration exceeding the time during which distortions occur responsive to the leading edge of a read out pulse.

5. The system of claim 4 and means wherein said *b* and *d* basic time slots have a duration which corresponds to the time required to transmit a read out pulse through said matrix.

References Cited

UNITED STATES PATENTS

| | | |
|---|---|---|
| 2,957,949 | 10/1960 | James et al. |
| 2,962,552 | 11/1960 | Crowley. |
| 3,050,589 | 8/1962 | Vaughan. |
| 3,281,536 | 11/1966 | Dupieux et al. |

ROBERT L. GRIFFIN, *Primary Examiner.*

J. A. BRODSKY, *Assistant Examiner.*